INVENTOR.
Joseph C. Rhodes

ATTORNEY

Jan. 10, 1961

J. C. RHODES 2,967,423

AUTOMATIC END POINT APPARATUS

Filed April 12, 1957

INVENTOR.
Joseph C. Rhodes
BY *Everett A. Johnson*
ATTORNEY

United States Patent Office 2,967,423
Patented Jan. 10, 1961

2,967,423

AUTOMATIC END POINT APPARATUS

Joseph C. Rhodes, Park Forest, Ill., assignor to Standard Oil Company, Chicago, Ill., a corporation of Indiana Filed Apr. 12, 1957, Ser. No. 652,391

7 Claims. (Cl. 73—17)

This invention relates to the automatic determination of the end point, i.e. the boiling point of the last volatile component of a mixture of liquids. More specifically, the invention relates to a system for measuring and recording the end point of a sample of a hydrocarbon distillate.

In the production of petroleum distillates, the primary specifications include those based on distillation properties. The high temperature end of a distillation curve is defined by specifying the maximum temperature permissible for a given product when distilled according to ASTM procedures (ASTM Test D–158–53). This maximum temperature, obtained by distilling the product to dryness, is called the end point for that product.

Limitations are placed upon the end points of products, such as kerosenes and heater oils, to prevent contamination with higher boiling products. However, there frequently is considerable economic incentive to produce distillates having end points as close to the specification limit as possible. In order to approach such specification limits, it has heretofore been the practice to make laboratory analyses of grab samples, but such laboratory control of processing involves such long time lags between sampling, analysis, reporting and adjustment of the processing unit that close control of the unit has been impossible. Consequently, the specification limit could not be as closely approached as might be desired because of danger of producing off-specification product while waiting for the laboratory results.

Devices for determining end points have heretofore been proposed but such prior devices have a relatively narrow range, are not adaptable for continued and repeated tests, and do not provide for good correlation with results by the ASTM test.

It is, therefore, a primary object of this invention to provide a system for automatic end point analysis which minimizes the time lag between sampling and process control. It is a further object of the invention to provide automatic apparatus for obtaining data which may be correlated with data obtained by the ASTM test.

Still another object of the invention is to provide an apparatus which will, in a continuous batch manner, determine the end point of a hydrocarbon distillate. A more particular object of the invention is to provide an apparatus which will determine the end point of hydrocarbon fluids, record the results of such determination, and automatically control the operating conditions of the processing unit which produced the hydrocarbon fluid under test. These and other objects of the invention will become apparent as the description thereof proceeds.

Briefly, according to my invention, I provide an automatic batch-type instrument requiring only that the operator pour in a sample of approximately 100 cc. and press a button to obtain a test. Tests require about 15 minutes each and the results agree with those obtained by ASTM Test D–158–53. It is adaptable for use on samples having end points as low as 200° F. and as high as 700° F.

The instrument determines and records end points from 200° F. to 700° F. and the entire range can be covered by one instrument. The standard deviation between careful ASTM end point tests and data obtained on the instrument is about 2 percent of the span of the instrument. The error due to contamination is less than 5 percent of the difference between the end points of successive samples. The reproducibility is 2° F. which is a precision that is at least as good as that obtained with the ASTM standard test.

The apparatus consists of a sample cup, a flask in which the sample is contained for the determination of the end point, a low heat capacity heater capable of evaporating the sample to dryness, a thermocouple located to measure the temperature of the vapors flowing from the vapor arm of the flask, and a recorder to indicate such vapor temperature. Solenoid-operated valves control the flow into and out of the flask and a program timer controls the various steps of the testing cycle. The distillation flask is enclosed within a thermostatically-controlled chamber to reduce the effects of ambient temperature changes.

The thermocouple and its lead wires are mounted directly in the vapor arm. A cooling coil is placed about the vapor arm near its junction with the distilling head and a filling line passing through the head introduces the sample near the bottom of the distillation flask. An asbestos ring is disposed between the bottom of the flask and the heater which may be supported by an adjustable post to permit quick replacement of the flask.

The advantages and additional details of my apparatus will be described by reference to the accompanying drawing forming a part of this specification and which comprises a schematic elevation of one embodiment of the invention and wherein.

Figure 1:
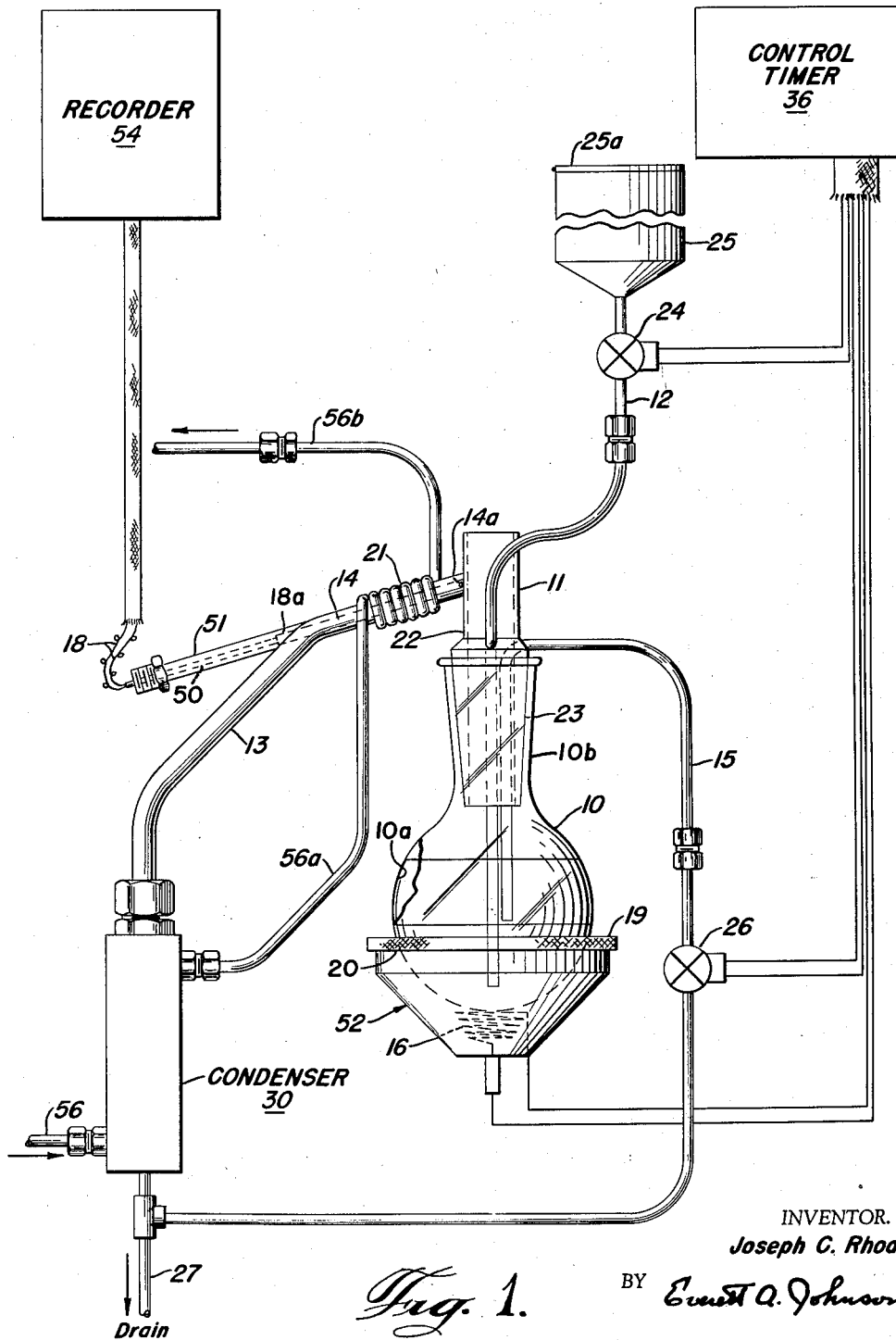
Figure 1 is a schematic elevation of one embodiment of the invention.
Figure 2:
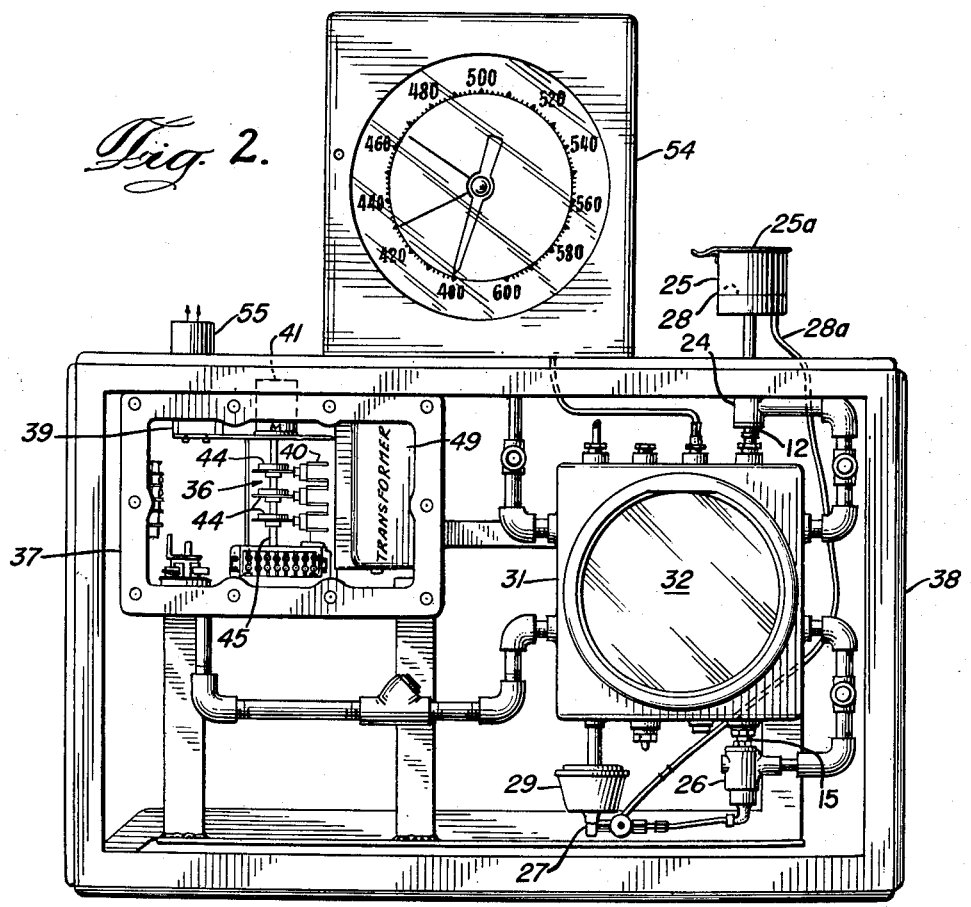
Figure 2 is an elevation of a preferred embodiment of the invention.
Figure 3:
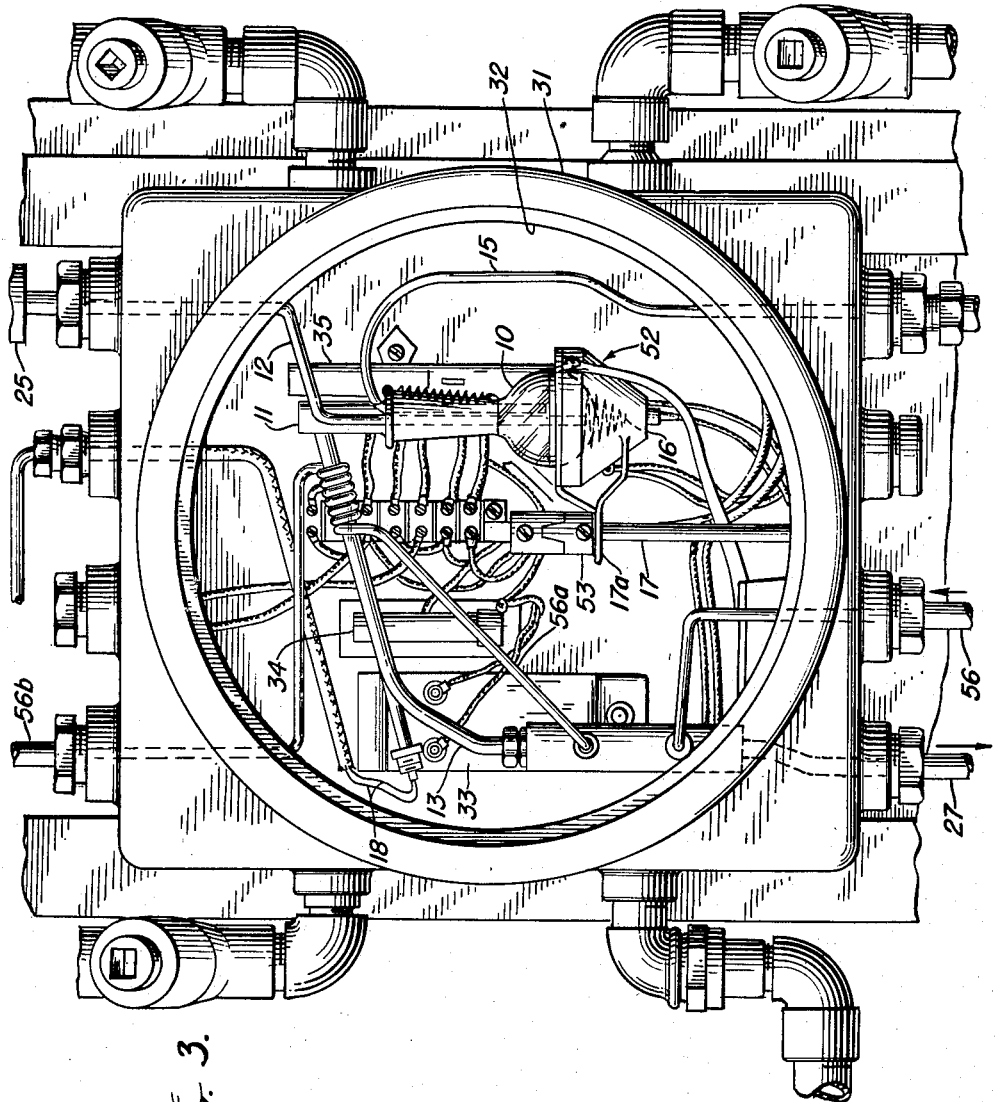
Figure 3 is an enlarged detail view of the distillation unit employed in the apparatus of Figure 2.
Figure 4:
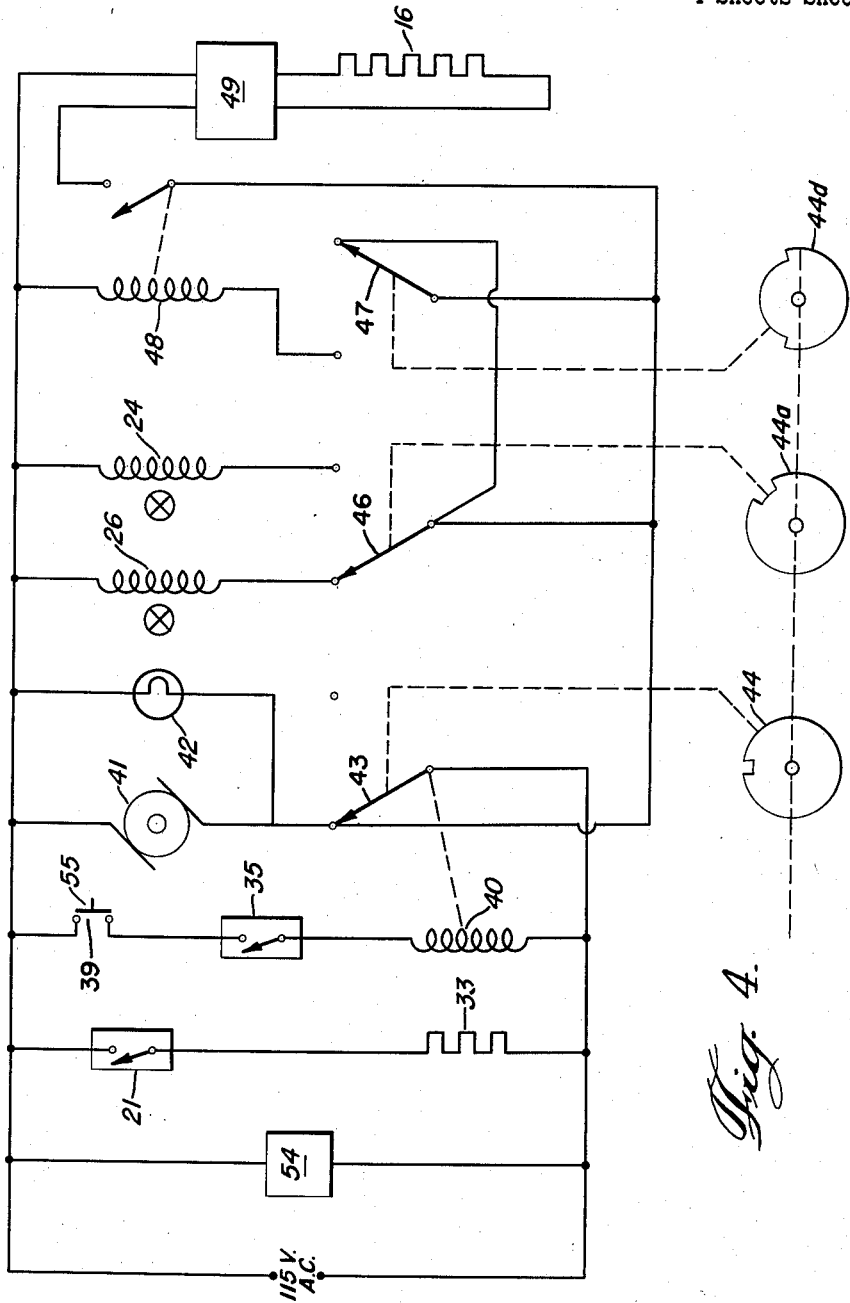
Figure 4 is a schematic electrical circuit diagram including the program timer employed in Figures 1 and 3.

Referring to the drawing, the distillation unit includes the distillation flask 10 with its distilling head 11 including valved filling line 12, vapor outlet arm 13, thermocouple 14, and the valved siphon line 15. The thermocouple tip 14a is placed in the vapor arm 13 very close to the point where the vapor arm 13 joins the distillation head 11. It is recessed within the upper end of the vapor arm 13 just far enough to insure that the tip 14a will be shielded from the direct radiation of the heater 16. In this manner, the thermocouple tip 14a receives its heat principally by convection from the passing vapors. It loses heat by radiation to the walls of the vapor arm 13 and by conduction through the thermocouple lead wires 18 which are provided with asbestos insulation 18a. This conduction is minimized by using very fine (#30 gauge) thermocouple wire. When the flow of vapors is fast enough through the vapor arm 13, the thermocouple tip 14a is essentially at the vapor temperature. However, when the end point of the sample is reached, the vapor flow decreases substantially, the thermocouple tip 14a loses heat by radiation at such a rate that its temperature is reduced and signifies the maximum temperature attained in the test. This maximum temperature is the end point of the sample.

The flask heater 16 is adjustably supported below the flask 10 with an asbestos ring 19 therebetween. The heater 16 may be adjustably supported on a post 17 provided with an indexing means. The asbestos ring 19 is similar to that used in the standard test and prevents excessive heating of the walls of the flask 10. The efficiency of the heater 16 is decreased somewhat by the ring 19 and the maximum obtainable liquid temperature would ordinarily be reduced. But this deficiency is counteracted by placing a reflector foil 20 underneath the plate or ring 19 to restore the efficiency of the heater 16.

It is essential in my apparatus that the temperature of the thermocouple 14 decrease when the end point is reached and overheating of the thermocouple 14 by radiation from the vapor arm 13 is avoided by providing the cooling coil 21 about the vapor arm 13 and passing cooling water through the coil 21. This cooling of the vapor arm 13 also serves to reduce the temperature of the distillation head 11. This tends to increase the amount of recycling of condensed vapors during the test and assist in assuring correlation of the results with those of the ASTM test. The ring 19 prevents excessive heating of the flask walls and further increases the amount of recycling.

The distilling head 11 includes an elongated generally tubular body 22 closed at its upper end and provided with an exterior standard tapered stopper portion 23. The filling line 12 enters the distilling head 11 and passes downwardly to a point near the bottom of the flask 10. The filling solenoid valve 24 on the filling line 12 is opened automatically and the sample runs into the bottom of the flask 10. The liquid rises in the flask 10 and passes out through the vapor arm 13 which communicates with the distilling head 11 at an upper part thereof. About 100 cc. of sample is introduced into the flask 10 from sample cup 25. The flask 10 has a capacity of about 50 cc. Any liquid residue which remains in the flask 10 from a previous test is washed up through the neck 10b of the flask 10 through the distilling head 11 and out the vapor arm 13. After sufficient time to allow all the sample to pass from the filling cup 25, a drain solenoid valve 26 is opened and the excess sample is siphoned from the flask 10 to the desired level (a volume of about 28 cc.) through a siphon tube 15 which extends into the flask 10, upwardly into the distilling head 11 and into the drain line 27.

The flask heater 16 is adjustably supported below the flask 10 on post 17 provided with an indexing means and the entire distillation unit is arranged within a temperature-controlled and explosion-proof housing 31 which may be provided with window 32 and a space heater 33 controlled by space thermostat 34. An inverse thermostat 35 controls power to the circuit including the program timer 36 which is housed within explosion-proof box 37. The program timer box 37 and the distillation unit housing 31 are mounted within a cabinet 38 which also includes the associated circuitry and the solenoid valves 24 and 26 on lines 12 and 15.

A sample cup 25, mounted on the top of the cabinet 38, is connected to the sample inlet line 12. The cup size is such that the operator need not measure out a given volume of sample, but merely fill the cup 25 to overflowing and a trough 28 conducts this excess via line 28a to the drain line 27. The explosion-proof drain 29 receives fluid from the condenser 30 for discharge through the drain line 27 with the liquid from overflow 28 and siphon line 15.

The test switch 39 actuates the timer relay 40 only if the system is at a high enough temperature to actuate the inverse thermostat 35. Thus, I prevent operation of the test until the housing or box 31 has reached a preselected temperature. Further, no sample can be added during a heating or cooling period since the valve 24 remains closed and prevents the introduction of a subsequent sample from the cup 25.

Actuation of the timer relay 40 initiates the program timer 36 for a single cycle of fifteen minutes, during which time the timer motor 41 and pilot light 42 receive power from switch 43 and the timer motor 41 rotates all the cams 44 on a common shaft 45.

At ten seconds after the test has been started, the cam 44a actuates switch 46 causing valve 24 to open for 150 seconds and allows all the sample to flow from cup 25. 160 seconds after the test has been started, the valve cam 44a deactuates switch 46 and opens valve 26 for 64 seconds, thus enabling siphoning to take place. 224 seconds after the test has been started, the heater cycle cam 44d actuates switch 47 which closes both valves and causes the heater relay 48 to switch power at 6.3 volts to the flask heater 16 through the transformer 49. The heater 16 will remain on for 530 seconds. This is followed by a cooling period of 146 seconds which is terminated by the cycle timer cam 44 ending the fifteen-minute test.

The flask 10 has a capacity of about 50 cc. and typically about 28.0±.5 cc. of liquid remains in the flask after siphoning. The neck has a ground standard taper to insure fitting with corresponding stopper taper 23 on the distilling head 11 and the center portion 10a of the flask 10 is silvered to reflect heat back to the sample.

The distilling head 11 is composed of stopper portion 23 and tubular body 22 which receives the inlet 12, the vapor tube 13 containing the thermocouple 14, and the siphon tube 15. The thermocouple 14 is iron-constantan and the junction is located in vapor arm 13 as previously described. The lead wires 18 are sealed into sleeve 50 within tube 51 which merges with arm 13.

The heater 16 comprises a ribbon of nichrome, which is coiled into a conical helix, and a stainless steel cup serving to support the nichrome ribbon and to act as a heater reflector 52. The heater 16 is positioned with respect to the flask 10 by the post 17 and a heater-position coupling 53. The heater 16 may be lowered and pivoted outward about the post 17 to permit removal of the flask 10.

When the heater 16 is turned on, it raises the temperature of the sample within the flask 10 and distillation soon begins. The condensing vapors escape through the vapor arm 13 on the distilling head 11 and heat the thermocouple 14 located within the vapor arm 13. The recorder 54 records the temperature of the thermocouple 14 while the temperature is above 200° F. The recorder 54 is a conventional potentiometer with cold end compensation and is calibrated for use with the iron-constantan thermocouple 14.

For most samples, the temperature reaches 200° F. about six minutes after the push button 55 of the test switch 39 is depressed and the pilot light 42 comes on. Near the end of the distillation, the amount of vapor passing the thermocouple 14 becomes less and less until the heat lost from the thermocouple 14 is greater than the heat supplied by the vapors. At this point, the thermocouple 14 begins to cool and the highest temperature recorded during the distillation is the end point of the sample.

Inverse thermoswitch 35 is mounted behind the flask 10 and its function is to prevent operation of the instrument until the temperature within the explosion-proof housing 31 containing the distillation unit has reached 120° F. The temperature of the housing 31 is controlled at about 130° F. by thermostat 34 and space heater 33.

The solenoid valves 24 and 26 are explosion-proof and control the flow of the sample into and out of the flask 10 and are actuated by the program timer 36.

The sample cup 25, provided with hinged cover 25a, has a capacity of about 100 cc. and surrounding the cup 25 is the overflow trough 28 which is connected to the drain line 27. The condenser 30 condenses the vapors escaping from the flask 10 via vapor tube 13 and may be cooled by water introduced via line 56 extending through the wall of the explosion-proof housing 31.

The test switch 39 is actuated by depressing the push button 55 and thereby initiates the fifteen-minute testing cycle by actuating the timer relay 40 which causes switch 43 to carry power to the timer motor 41 for a fifteen-minute period which is maintained and terminated by means of the timer relay cam 44.

Referring to the drawings, the operator fills the sample cup 25 to overflowing and immediately presses the push button 55. The pilot light 42 on top of the instrument case 38 indicates that a test is in progress. The program timer 36 opens the solenoid valve 24 allowing the sample to flow from cup 25 into the flask 10 and out the vapor tube 13 after the flask 10 is filled. The solenoid valve 24 is closed and solenoid valve 26 opens causing the sample to be siphoned from flask 10 by line 15 to the desired level. The heater 16 is then turned on and solenoid valves 24 and 26 are closed. After a total operation of about fifteen minutes, the program timer 36 stops, the red light 42 is turned off, and the instrument is ready to receive another sample.

Although my invention has been described with reference to specific embodiments thereof, it should be understood that these are by way of illustration only and that modifications are contemplated without departing from the spirit of my invention.

What I claim is:

1. A distillation unit for end point determinations comprising in combination a distillation flask, a distilling head on said flask, conduit means extending through said head for introducing sample liquid into said distillation flask, heating means for said flask to vaporize said liquid therein, vapor discharge tube means connected to said head for withdrawing vapors from said flask, temperature-responsive means within the inlet end of said discharge tube means, said temperature-responsive means being shielded by said tube from radiant heat and being heated essentially only by vapors flowing in said discharge tube means, temperature indicating means connected to said temperature-responsive means, siphon tube means extending into said flask, solenoid valve means on said conduit means and on said siphon tube means, and cooling coil means in heat exchange with said vapor discharge tube whereby said discharge tube is cooled.

2. A distillation unit for end point determinations comprising in combination a distillation flask, distilling head means removably disposed on said flask, conduit means extending through said head for discharging sample liquid into a lower portion of said distillation flask, heating means for said flask to vaporize said liquid therein, support means for operatively positioning said heating means with respect to the bottom of said flask, vapor discharge tube means connected to said head for withdrawing vapors from said flask, thermocouple means within said tube means adjacent its junction with said head, said thermocouple means being heated essentially only by convection by vapors flowing through said tube, temperature indicating means connected to said thremocouple means, siphon tube means extending through said head into said flask, solenoid valve means on said conduit means and on said siphon tube means, and cooling coil means in heat exchange with said vapor discharge tube.

3. A distillation unit for end point determinations comprising in combination a distillation flask, a removable distilling head on said flask, conduit means for introducing sample liquid through said head into said distillation flask, the said conduit means extending to the bottom of the flask and providing a flow which maximizes flushing and avoids contamination from residue of previous test, heating means operatively positioned subjacent to said flask, vapor discharge tube means withdrawing vapors from said head, temperature-responsive means supported within said tube means in the path of vapors flowing therethrough, said temperature-responsive means being shielded from said heating means, temperature indicating means connected to said temperature-responsive means, siphon tube means extending into said flask through said head and adjacent the bottom of said flask and spaced therefrom, solenoid valve means on said conduit and on said siphon tube means, radiant heat deflector ring means between said flask and said heater means shielding the exterior walls of the distillation flask from radiant heat, and cooling coil means wrapped about said vapor discharge tube whereby said discharge tube is cooled.

4. A distillation unit for end point determinations comprising in combination a distillation flask, a distilling head on said flask, conduit means for introducing sample liquid into said distillation flask through said head, heating means applied to the bottom of said flask to vaporize said liquid therein, vapor discharge tube means connected to said head for withdrawing vapors therefrom, temperature-responsive means within said tube means in the path of vapors flowing therethrough, said temperature-responsive means being heated essentially only by the flow of vapors from said flask, temperature indicating means connected to said temperature-responsive means, siphon tube means extending into said flask through said head, solenoid valve means on said conduit and on said siphon tube means, support means for operatively positioning said heating means with respect to the bottom of said flask, radiant heat deflector ring means disposed between the flask and said heater to minimize overheating of the outer surface of the walls of the distillation flask, and cooling coil means associated with said vapor discharge tube.

5. An apparatus for determining the end point of a liquid sample which comprises in combination a distillation unit, a sample cup means elevated so as to have a hydrostatic head above the distillation unit, a siphon tube means extending from the distillation unit, a vapor line discharging from said distillation unit, thermocouple means disposed in an upper part of said line, a first solenoid valve on a conduit between said sample cup and said distillation unit, a second solenoid valve means on said siphon tube means, electrical heating means for said distillation unit, said first and second solenoid valve means and heating means being controlled by a program timer, a cooling coil about said vapor line, radiant heat deflector ring means between said electrical heating means and said distillation unit, and temperature-indicating means operatively connected with said thermocouple means.

6. An apparatus for ascertaining the end point of a hydrocarbon liquid which comprises a distillation chamber, a head for said chamber, means for introducing a liquid sample into said distillation chamber through said head, means for applying heat to the distillation chamber surface to vaporize the liquid to dryness, transfer conduit means for withdrawing vapors continously from said distillation chamber through said head, means for cooling said vapors flowing through said transfer conduit, and means within the inlet of said conduit for measuring the temperature of the withdrawn vapors at the inlet of said transfer conduit, the peak temperature measured corresponding to the end point of the liquid sample under test, said means for measuring the vapor temperature being shielded from radiant heat from said means for applying heat.

7. The apparatus of claim 5 wherein said distillation unit comprises a flask and said flask is provided with center wall portions thereof which comprise a heat reflector to reflect heat back to the liquid sample.

References Cited in the file of this patent

UNITED STATES PATENTS

| | | |
|---|---|---|
| 401,413 | Clark | Apr. 16, 1889 |
| 1,307,601 | Saunders | June 24, 1919 |
| 1,632,748 | Parsons et al. | June 14, 1927 |
| 2,594,683 | Rolfson | Apr. 29, 1952 |
| 2,654,242 | Fallgatter et al. | Oct. 6, 1953 |

OTHER REFERENCES

"The Freezing-Point, Boiling-Point and Conductivity Methods" (Jones), published by Chemical Publishing Co. (Easton, Pa.), 1897 (pp. 34 to 36 relied on).